April 27, 1965 R. BINDER 3,180,470
CLUTCH DISK
Filed May 1, 1963 2 Sheets-Sheet 1
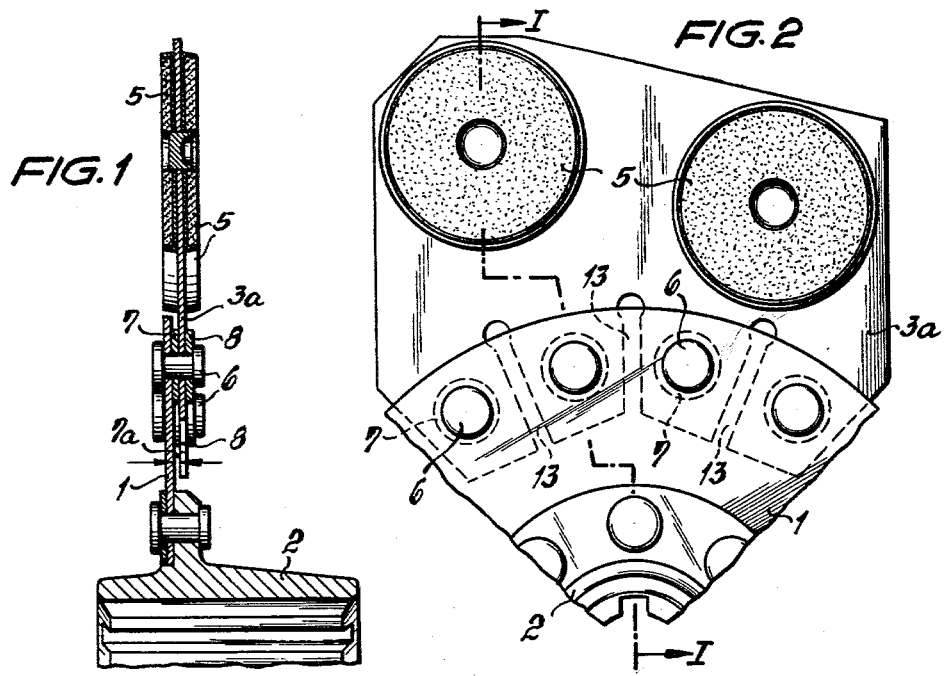
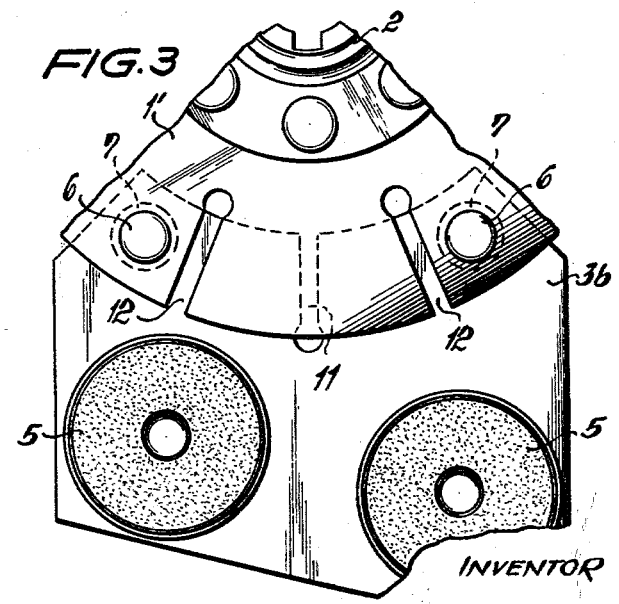
INVENTOR
Richard Binder
By April 27, 1965  R. BINDER  3,180,470
CLUTCH DISK Filed May 1, 1963  2 Sheets-Sheet 2

INVENTOR
Richard Binder
By Richard Ernst
Agt

United States Patent Office 3,180,470
Patented Apr. 27, 1965

3,180,470
CLUTCH DISK
Richard Binder, Schweinfurt am Main, Germany, assignor to Fichtel & Sachs A.G., Schweinfurt am Main, Germany, a corporation of Germany
Filed May 1, 1963, Ser. No. 277,302
Claims priority, application Germany, May 4, 1962, F 36,715
10 Claims. (Cl. 192—107)

This invention relates to clutch disks, and more particularly to clutch disks for use with metallic friction facings or with friction facings of other materials which are good heat conductors.

Powder metal clutch facings and friction facings at least partly consisting of metal have superior service life in heavy duty applications as in heavy trucks, construction machinery, and track-laying vehicles. Their resistance to elevated operating temperatures accounts to a large extent for their desirable properties. It is conventional to mount such friction facings on segment-shaped carrier elements, and to rivet the carrier elements to a circular plate which may then be attached to the clutch shaft. The plate is usually made of high strength steel which is a relatively poor conductor of heat.

The heat transmitted from the friction facings to the plate caused difficulties even when friction facings were made of materials having relatively low heat conductivity. With metallic or partly metallic friction facings, the heat generated by friction when the clutch slips is transmitted by the carrier elements to the plate at a rate much higher than the rate of heat transmission from the outer rim portion of the plate in a radially inward direction.

The resulting more rapid thermal expansion of the plate rim causes warping of the plate which cannot be avoided by the expedients employed heretofore in conjunction with non-metallic friction facings, such as radial slots in the plate. Warping of the plate causes displacement of the friction facings from their normal common plane of rotation, and interferes with proper operation of the clutch. Warping also generates stresses in the plate so that cracks are formed and the plate may break in service.

An object of the invention is the provision of a clutch disk suitable for use with metallic and similar friction facings which resists the sudden temperature changes inherent in the operation of such clutches.

Another object is the provision of a clutch disk in which the plate is protected from the heat generated in the friction facings.

An additional object is the provision of a clutch disk in which any distortion caused by thermal stresses under particularly severe operating conditions is fully reversed upon cooling.

With these and other objects in view, the invention in one of its aspects interposes spacers between a central plate and the carrier elements on which the friction facings are mounted. The spacers separate each carrier element from the central plate so as to form an air gap between the plate and the element for retarding heat transfer from the carrier element to the plate.

Additionally, the carrier elements may be provided with radial slots extending outward from an inner rim in each carrier element between two circumferentially adjacent rivets which connect the carrier elements to the plate, thus reducing or preventing the transfer of stresses from the carrier element to the plate. The plate itself may further be radially slotted, and the combination of judiciously distributed slots in the plate and in the carrier elements with the aforementioned spacers has been found to eliminate mechanical failure or significant warping of the central plate even under severe operating conditions.

Other features and many of the attendant advantages of this invention will be readily appreciated as the same becomes better understood by reference to the following detailed description when considered in connection with the accompanying drawings wherein:

FIG. 1 shows one half of a clutch disk of the invention in substantially axial section on the line I—I in FIG. 2;

FIG. 2 is a fragmentary plan view of the disk of FIG. 1 taken in the direction of the axis of rotation, one of four identical quarters of the disk being shown;

FIG. 3 illustrates another disk of the invention in a view corresponding to that of FIG. 2;

Figure 5:
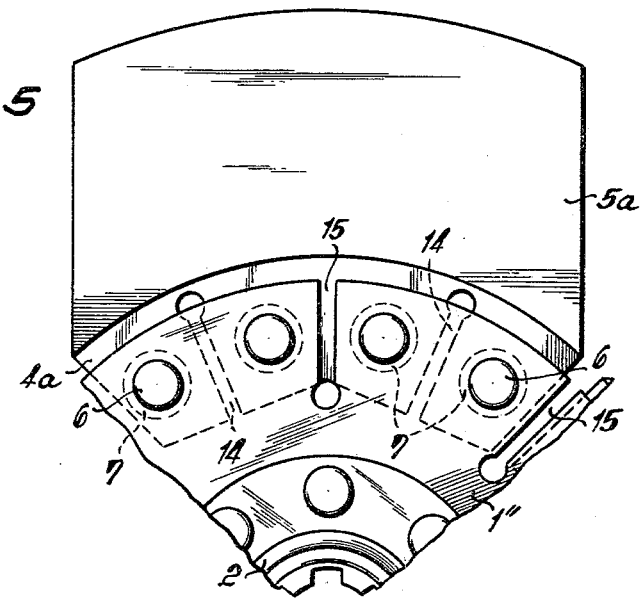
FIG. 5 is a plan view of one quarter of a coupling disk closely similar to that shown in FIG. 4.

Referring initially to FIGS. 1 and 2, there is seen a clutch disk intended to be interposed between the flywheel and a pressure plate in an automotive power train to constitute the driven member of an otherwise conventional clutch assembly. An annular plate 1 forming the central portion of the disk is riveted to a splined hub 2 for rotation with a clutch shaft (not shown). Four circumferentially juxtaposed segments 3a are attached to the central plate 1 by means of pin-shaped rivets 6 to project radially beyond the outer boundary thereof so that a narrow radial gap is formed between adjacent segments, four rivets being used for attaching each segment.

An inner edge portion or an inner rim of each segment 3a is superimposed on an outer edge portion or an outer rim of the plate 1 in axially spaced relationship so that a relatively wide overlapping of the plate and segments is achieved, the spacing being maintained by a circular washer 7 associated with each rivet 6. The washers are made of metal or of heat insulating material such as asbestos composition, and maintain air gaps 7a between relatively wide portions of the central plate 1 and the segments 3a. Washers 8 interposed between the heads of the rivets 6 and the segments 3a reinforce the latter.

Each segment 3a carries two pairs of circular friction facings 5. The members of each pair are attached to opposite faces of the segment by a common rivet connection, and are circumferentially and radially offset from the corresponding members of the other pair. The friction facings 5 consist of powder metal compositions conventional in themselves for this purpose.

The inner rim of each segment 3a is divided into four lugs by three radial slots 13, each lug being attached to the central plate 1 by a respective rivet 6. The slots 13 extend radially outward somewhat beyond the outer boundary of the annular plate 1, and their outer terminal portions are rounded and enlarged to avoid stress concentrations.

The modified clutch disk of the invention shown in FIG. 3 is closely similar to that illustrated in FIG. 2, and a section may be taken through the disk of FIG. 3 in such a manner that the corresponding sectional view will be identical with FIG. 1. The annular central plate 1' of the clutch disk has eight radial slots 12 which extend inward from the outer boundary of the plate and terminate at the inward ends in enlarged rounded openings. The slots are offset 45° from each other, two slots only being visible in FIG. 3, and divide the outer rim of the plate 1' into eight projecting lugs.

Each of the four segments 3b attached to the plate 1' has a single radial slot 11 which extends radially outward from the inner periphery of the segment and divides the inner rim of the segment into two lugs. In the assembled condition of the disk, the slots 11 are circumferentially interposed between two slots 12.

Two rivets 6 connect each segment 3b to the plate 1', the arrangement being such that rivets associated with two circumferentially adjacent segments 3b are fastened to a common lug of the plate 1'.

The attaching of the segments 3b to the plate 1' illustrated in FIG. 3 is quite adequate for clutches rotating at relatively low speed. The embodiment of the invention best seen in FIG. 2 is preferred for high speeds of rotation. Even high operating temperatures cannot result in a warping of the segments 3a which could interfere with normal clutch operation. What little deformation of the segments may occur at high temperatures disappears when frictionally developed heat is dissipated and normal temperature is restored.

In the modification of the invention shown in FIG. 5, each of four segments 4a is attached to an annular central plate 1" by four rivets 6 equipped with washers 7. The plate 1" has eight slots 14 which extend radially inward from the outer boundary of the plate and divide the outer rim into eight equal lugs. Two radial slots 14 in each segment divide the inner rim of the segment into two smaller terminal lugs and a central lug having circumferential dimensions equal to the combined corresponding dimensions of the smaller lugs.

Two rivets 6 connect the central lug of the segment 4a with two lugs of the plate 1" which are separated by a slot 15, and a single rivet attaches each of the smaller lugs of the segment 4a to the respective lug. A slot 15 is thereby aligned with the gap between two circumferentially adjacent segments 4a. Each segment carries two friction facings 5a which substantially cover the portions of the segment radially extending beyond the plate 1". The friction facings 5a are of sintered metal.

The arrangement of slots and rivets shown in FIG. 5 is particularly useful where extreme temperature differences occur in the clutch disk. Deformation of the clutch segments is held to a minimum and is fully reversible. The slots 15 which are aligned with the gaps between adjacent segments provide an efficient barrier to heat transfer, but they weaken the plate 1". The clutch disk of the invention shown in FIG. 5 is therefore preferably employed where extreme thermal stresses are superimposed on relatively low mechanical stresses of operation at lower speeds.

Figure 4:
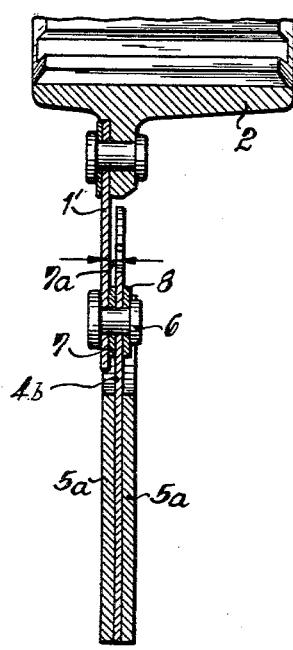
FIG. 4 shows another embodiment of the coupling disk of the invention in elevational section on the line IV—IV in FIG. 6, only one half of the disk being illustrated.
Figure 6:
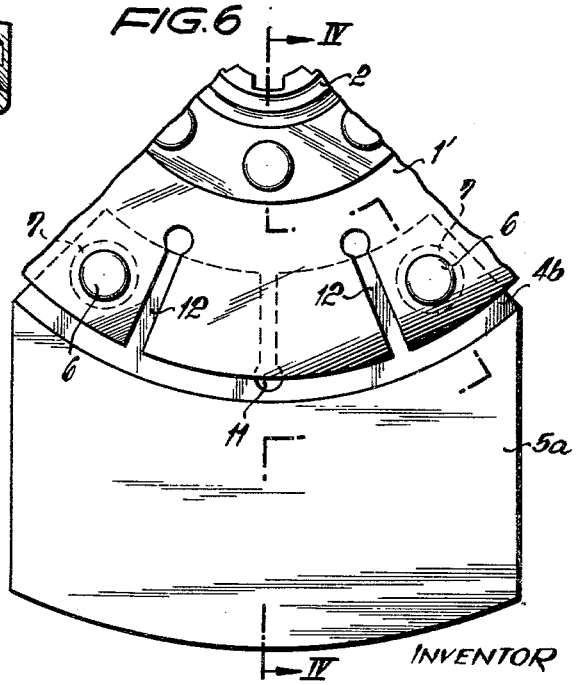
FIG. 6 is a fragmentary plan view of the disk of FIG. 4 in the manner of FIGS. 2, 3, and 5.

It will be appreciated that FIG. 4 is representative of a generally axial section taken through the clutch disk of FIG. 5, but also shows the disk of FIG. 6 in section on the line IV—IV.

Two rivets 6 connect each of the four segments 4b in the clutch disk of FIGS. 4 and 6 to a central, generally annular plate 1' identical with the corresponding element of the disk shown in FIG. 3. Eight uniformly spaced slots 12 extend radially inward from the outer boundary of the plate 1'. The inner rim of the segment 4b is divided into two lugs by a slot 11, and each segment 4b is attached to the plate 1' in the manner described hereinabove with reference to FIG. 3. The friction facings 5a carried on the segments 4b are identical with the facings on the segments 4a shown in FIG. 5.

The powder metal or sintered metallic frictions facings 5 and 5a rapidly transmit frictionally developed heat to the respective segments 3a, 3b, 4a, 4b on which they are mounted. The heat generated is particularly intense during slipping of the clutch when engagement of the clutch disk with the cooperating faces of a flywheel and a pressure plate is incomplete. The air gaps 7a between the segments and the central plates 1, 1', 1" greatly retard heating of the outer rim of the plate and the warping of the plate due to differences in temperature between the plate rim and the portion of the plate adjacent the hub 2. Where service conditions are extremely severe and significant thermal stresses in the plate cannot be entirely avoided, the radial slots in the plate permit some differential expansion of the plate rim without interference with clutch operation, and make the expansion fully reversible. The slots in the segments similarly permit reversible deformation of the segments and reduce the transmission of circumferential stresses from the segments to the central plate. The washers 7 whose projected area in the radial plane is only a small fraction of the projected area of the associated friction facings contribute to such reduction in stress transmission by reducing the contact area between a segment and a member fixed to the plate, and vice versa. Frictional engagement between relatively large engaged surface areas of segments and plate has been found to be a significant factor in limiting the utility of conventional clutch disks of the type described.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A clutch disk comprising
    (a) a plate member having an outer boundary rotatable about an axis,
    (b) a plurality of carrier elements fastened to said plate member about said axis to project radially beyond said boundary and to have said plate member and said carrier elements overlap each other across surfaces of a relatively large radial width,
    (c) friction facings on each of said elements,
    (d) fastening means securing said carrier elements to said plate, and including spacer means between said plate member and each of said carrier elements for axially spacing each element from said plate member and creating an air gap between said overlapping surfaces of relatively large radial width.

2. A disk as set forth in claim 1, wherein the projected area of the friction facing on each carrier element in a plane radial with respect to said axis is substantially greater than the projected area in said plane of the spacer means interposed between said element and said plate member.

3. The disk as set forth in claim 1, wherein each of said carrier elements has an inner periphery and is formed with at least a single slot extending outwardly from said periphery substantially across said relatively large radial width.

4. The disk as set forth in claim 3, wherein said fastening means include a plurality of pin members circumferentially spaced about said axis, and disposed within the area of said overlapping surfaces, and each of the slots formed in said carrier elements extends between two circumferentially adjacent pin members.

5. The disk as set forth in claim 4, wherein each of said carrier elements is formed with three slots, and four of said pin members secure each of said carrier elements to said plate.

6. The disk as set forth in claim 1, wherein said plate member is formed with at least a single slot extending inwardly from said boundary substantially throughout said relatively large radial width.

7. The disk as set forth in claim 6, wherein said fastening means include a plurality of pin members circumferentially spaced about said axis, and disposed within the area of said overlapping surfaces, and each slot formed in said plate member extends between two circumferentially adjacent pin members.

8. The disk as set forth in claim 6, wherein said fastening means include a plurality of pin members circumferentially spaced about said axis, and disposed within the area of said overlapping surfaces, a slot formed in said plate alternates with a slot formed in one of said carrier elements, and each of the slots in said plate and carrier elements extends between two circumferentially adjacent pin members.

9. The disk as set forth in claim 8, wherein four of said pin members secure each of said carrier elements to said plate, each carrier element is provided with two endwise disposed slots, and said plate has a slot centrally of said two slots.

10. The disc as set forth in claim 6, wherein said fastening means include a plurality of pin members circumferentially spaced about said axis, and disposed within the area of said overlapping surfaces, two of said pin members secure each of said carrier elements to said plate, and a slot formed in said plate and two slots formed in each of said carrier elements extend between said two pin members.

References Cited by the Examiner
UNITED STATES PATENTS 1,825,981   10/31   Reed.
2,327,884   8/43    Goodwin.

FOREIGN PATENTS 616,259     3/61    Canada.
1,132,609   11/56   France.
533,517     2/41    Great Britain.
752,564     7/56    Great Britain.
858,316     1/61    Great Britain.

DAVID J. WILLIAMOWSKY, *Primary Examiner.*